Sept. 6, 1955  K. C. AGAR  2,717,150
CHOKE VALVE ASSEMBLY
Filed July 6, 1951  2 Sheets-Sheet 1

INVENTOR.
KENNETH C. AGAR
BY
Thos. L. Donnelly
ATTORNEY.

Sept. 6, 1955 K. C. AGAR 2,717,150
CHOKE VALVE ASSEMBLY
Filed July 6, 1951 2 Sheets-Sheet 2
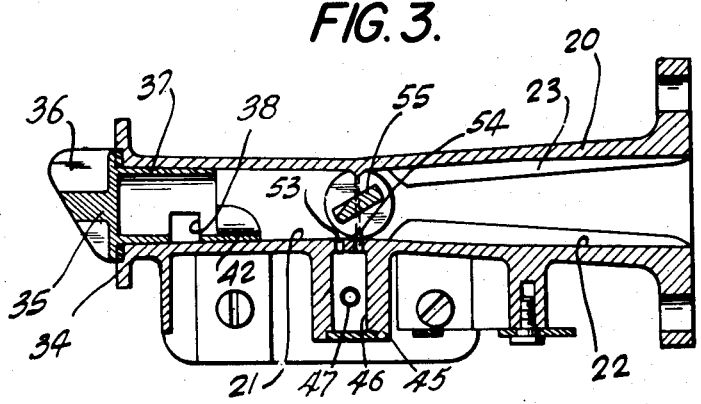
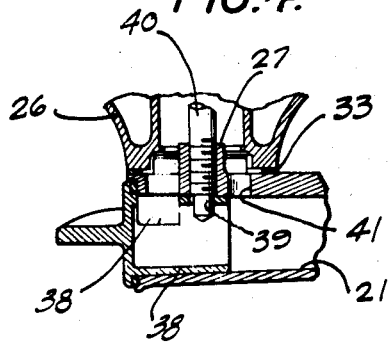
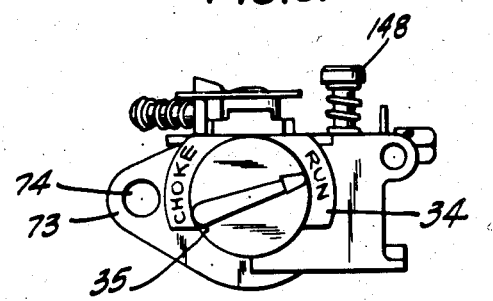
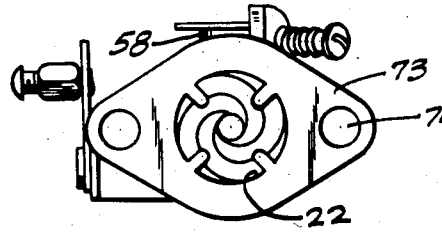
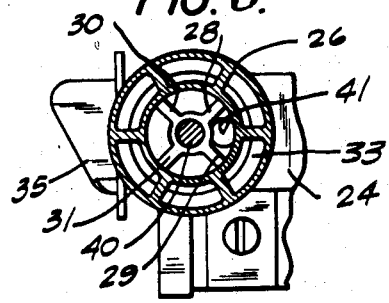
INVENTOR.
KENNETH C. AGAR
BY
Thos L Donnelly
ATTORNEY.

United States Patent Office 2,717,150
Patented Sept. 6, 1955

2,717,150

CHOKE VALVE ASSEMBLY

Kenneth C. Agar, Ann Arbor, Mich., assignor to Clinton Machine Company, Clinton, Mich., a corporation of Michigan Application July 6, 1951, Serial No. 235,406

4 Claims. (Cl. 261—64)

My invention relates to a new and useful improvement in a fuel and air mixing device adapted for use on internal combustion engines. The invention is particularly adapted for use on one and two cylinder engines and, generally, in this type of engine, the conventional carburetor is eliminated and a fuel and air mixing device, such as is disclosed herein, is used therewith.

It is an object of the present invention to provide a fuel and air mixing device of this class which will be simple of structure, economical of manufacture, durable, compact and highly efficient in use.

It is an object of the present invention to provide a fuel and air mixing device adapted for mounting on the tank in which the gas or fuel is contained and so constructed and arranged so that a maximum of strength may be provided in the conduit bearing portion and a firm mounting of the same on the tank may be effected.

Other objects reside in the detail of structure and operation to be explained hereinafter.

It is recognized that various modifications and changes may be made in the detail of structure illustrated without departing from the invention and it is intended that the present disclosure shall be considered but the preferred embodiment.

Forming a part of this application are drawings in which,

Fig. 3 is a sectional view taken on line 3—3 of Fig. 1.

Fig. 4 is a fragmentary view taken on line 4—4 of Fig. 2.

Fig. 5 is a rear end elevational view of the invention.

Fig. 6 is a front end elevational view of the invention.

Fig. 8 is a fragmentary sectional view taken on line 8—8 of Fig. 1.

Figure 1:
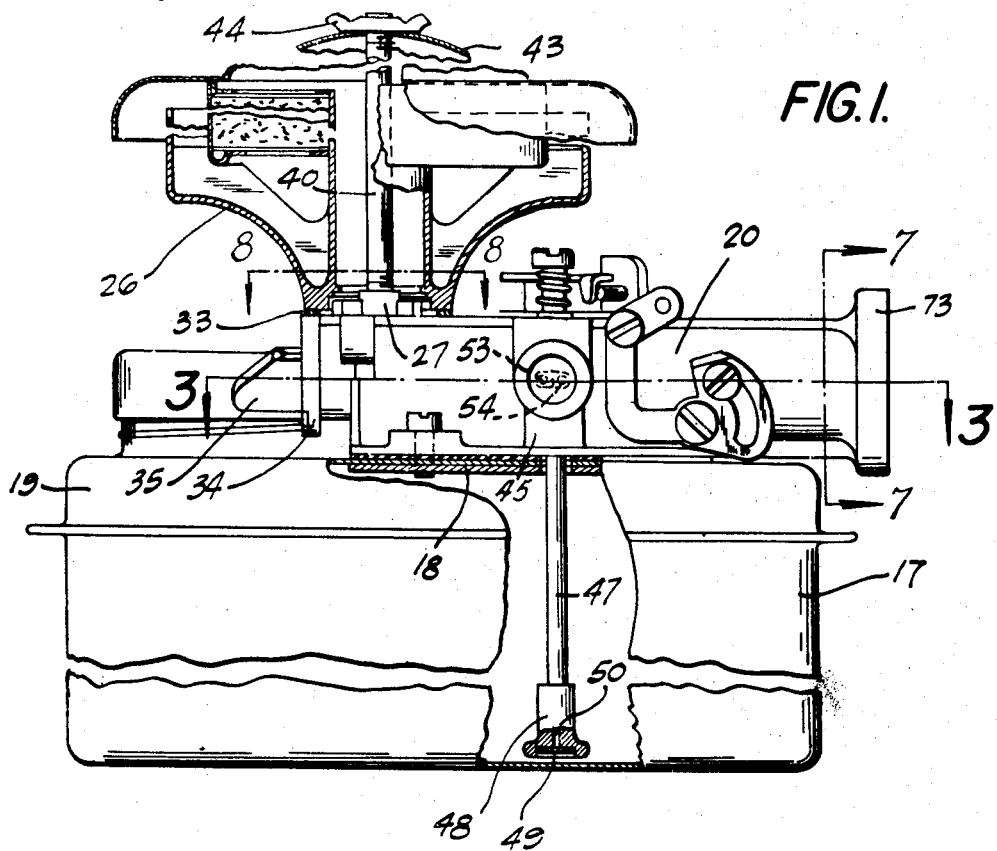
Fig. 1 is a side elevational view of the invention with parts broken away and parts shown in section.
Figures 2, 7:
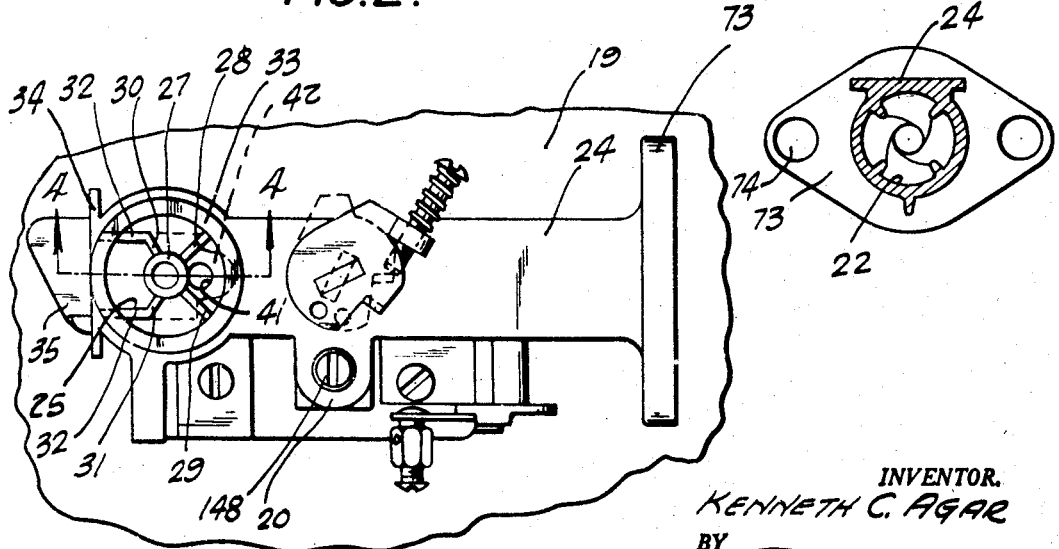
Fig. 2 is a top plan view of the invention.
Fig. 7 is a sectional view taken on line 7—7 of Fig. 1.

In the drawings, I have shown the invention used with a fuel tank 17 positioned in which is a reinforcing plate 18 secured to the under-surface of the top 19 by welding or in any other manner suitable. The invention comprises an elongated tubular body 20, having the bore 21 formed therein. This bore terminates adjacent one end of the body 20 in an enlarged tapered bore 22 in which are formed the inwardly projecting ribs 23 arranged spirally within the bore.

The top surface 24 of the body 20 is a flat, planar face. Formed in this face 24, adjacent one end, is an inlet opening 25 for establishing communication of the bore 21 with the interior of an air cleaner 26 which is mounted thereon. Projecting upwardly from the top face 24 is a neck 27 which is internally threaded and which communicates with the bore 21. Radiating outwardly from this neck 27 are ribs 28, 29, 30 and 31. Each of the ribs 30 and 31 has an angularly turned portion 32 which extends along opposite sides of the opening 25. Embracing these ribs is a ring 33 of suitable sealing material against which engages the end face of the cleaner 26. This end face has an opening formed therein which also embraces the ribs 28, 29, 30 and 31 and which is in communication, through the opening 25, with the interior of the bore 21.

A choke valve is inserted in the rear end 34 of the body 20 and comprises a head 35 having a boss 36 thereon whereby the valve may be rotated. Extending inwardly from the head 35 is a tube 37 having a portion cut away as at 38 so that when rotated to one position this cut away portion will be in registration with the opening 25 so that communication between the bore 21 and the air cleaner may be established. When rotated out of this registering position, this communication will be closed. Formed in the tube 37 is a slot 39 into which extends the end of the retaining rod 40. This rod 40 threads through the neck 27 and engages at its end in the slot 39 so as to prevent removal of the choke valve while at the same time permitting rotation of this choke valve within the limits of the slot 39. With some types of invention, and particularly with those of larger horsepower, it is desirable that a larger amount of air shall be drawn into the bore 21. In order to accomplish this, a hole 41 is drilled through the body 20 so that the cleaner 26 may communicate with the bore 21 through the hole 41 as well as through the opening 25. In order to serve as a closure for the opening 41, I have provided a tongue 42 which projects from the end of the tube 37.

The rod 40 projects above the cover 43 and a wing nut 44 is threaded on the rod 40 to securely hold the air cleaner in contact with the gasket 33.

Formed on the side of the body 20 is a boss 45 having a chamber 46 with which communicates a pipe 47 which projects through the tube of the tank and is provided at its end with a head 48, having a filter element 49 to filter the fuel through the pipe into the bore 50 of the tube 47. Communication of the chamber 46 with the pipe 47 is controlled by a needle valve 148, normally prevented from rotation by a spring in a well-known manner. The chamber 46 is in communication with the bore 21 through the orifices or openings 53 and 54. Rotatably positioned in the bore 21, slightly forwardly of the orifices or openings 53 and 54, is a throttle valve, comprising a plate 55 which is adapted to function in the usual manner of throttle valves.

The body 20 is provided at one end with a flange 73 having openings 74 formed therein, whereby the flange 73 may be secured over the inlet port of an internal combustion engine with which the invention is used.

The construction is such that when the engine is in operation, fuel will be drawn from the tank 17 through the pipe 47 and permitted to pass through the orifices 53 and 54 into the bore of the body 20. The throttle valve functions in the usual manner of throttle valves. Experience has shown that a structure of this type, one which functions most efficiently, produces a smooth operation of the engine and a quick starting of the same.

When the choke is mounted in the position shown, it may be rotated to close the openings 25 and 41. It may also be rotated to open these openings 25 and 41 to communicate with the interior of the air cleaner 26 so that air may be drawn through the air cleaner into the bore 21. In this movement towards uncover position, the opening 25 will be first uncovered, and after this opening has been uncovered a certain distance, the opening 41, as it is passed, will begin to be uncovered so that air in excess of the amount which may be drawn through the opening 25 may be permitted to pass into the opening 21.

What I claim is:

1. In a fuel and air mixing device of the class described, a body having a passage formed therethrough for flow of fluid therethrough, said body having an upper planar face; and a flange extending longitudinally of said body and projecting outwardly from opposite sides of said planar face, said body having adjacent one end an opening formed therethrough to communicate with the passage therein; a neck projecting upwardly from said face of said body adjacent said opening; and a plurality of ribs radiating outwardly from said neck, said ribs terminating at their ends to define a circle, a gasket ring positioned on said face of said body and embracing said ribs and surrounding said opening; an air cleaner embodying a bowl having an opening formed in one end embracing said ribs and engaging at its end face with said gasket; a choke valve rotatably mounted in the end of said body and serving as a closure for said end, said choke valve having a circumferential slot formed therein; a threaded stem threaded through said neck and extending at one end into said slot for preventing axial movement of said choke valve, the opposite end of said stem projecting through said air cleaner; and a nut threaded on said stem for retaining said air cleaner in sealing engagement with said gasket, said choke valve having a cutaway portion moveable into and out of registration with said opening in said body for controlling communication of the passage through said body with the interior of said air cleaner.

2. In a fuel and air mixing device of the class described, a body having a passage formed therethrough for flow of fluid therethrough, said body having an upper planar face; and a flange extending longitudinally of said body and projecting outwardly from opposite sides of said planar face, said body having adjacent one end an opening formed therethrough to communicate with the passage therein; a neck projecting upwardly from said face of said body adjacent said opening; and a plurality of ribs radiating outwardly from said neck, said ribs terminating at their ends to define a circle; a gasket ring positioned on said face of said body and embracing said ribs and surrounding said opening; an air cleaner embodying a bowl having an opening formed in one end embracing said ribs and engaging at its end face with said gasket; a choke valve rotatably mounted in the end of said body and serving as a closure for said end, said choke valve having a circumferential slot formed therein; a threaded stem threaded through said neck and extending at one end into said slot for preventing axial movement of said choke valve, the opposite end of said stem projecting through said air cleaner; and a nut threaded on said stem for retaining said air cleaner in sealing engagement with said gasket, said choke valve having a cut-away portion moveable into and out of registration with said opening in said body for controlling communication of the passage through said body with the interior of said air cleaner, there being an additional opening formed in said body within the area surrounded by said sealing ring and communicating with the interior of said air cleaner and said passage in said body; and a tongue projecting outwardly from the end of said choke valve moveable into position for covering and uncovering said additional opening.

3. In a fuel and air mixing device of the class described, a body having a passage formed therethrough for flow of fluid therethrough, said body having adjacent one end an opening formed therethrough to communicate with the passage therein; an air cleaner bowl mounted on said body adjacent one end thereof and having an opening formed therein in communication with the opening in said body; a choke valve rotatably mounted in the end of said body and serving as a closure for said end, said choke valve having a circumferential slot formed therein; a threaded stem for securing said bowl on said body and threaded at one end through said body and extending at said end into said slot for preventing axial movement of said choke valve, said choke valve having a cutaway portion movable into and out of registration with said opening in said body for controlling communication of the passage through said body with the interior of said air cleaner.

4. In a fuel and air mixing device of the class described, a body having a passage formed therethrough for flow of fluid therethrough, said body having adjacent one end an opening formed therethrough to communicate with the passage therein; an air cleaner bowl mounted on said body adjacent one end thereof and having an opening formed therein in communication with the opening in said body; a choke valve rotatably mounted in the end of said body and serving as a closure for said end, said choke valve having a circumferential slot formed therein; a threaded stem for securing said bowl on said body and threaded at one end through said body and extending at said end into said slot for preventing axial movement of said choke valve, said choke valve having a cutaway portion moveable into and out of registration with said opening in said body for controlling communication of the passage through said body with the interior of said air cleaner, there being an additional opening formed in said body communicating with the interior of said bowl and said passage in said body; and a tongue projecting outwardly from the end of said choke valve movable into position for covering and uncovering said additional opening.

References Cited in the file of this patent

UNITED STATES PATENTS

| | | |
|---|---|---|
| 1,120,397 | Martin | Dec. 8, 1914 |
| 1,288,942 | Livingston | Dec. 24, 1918 |
| 1,293,753 | Gibson | Feb. 11, 1919 |
| 1,741,401 | Bryan | Dec. 31, 1929 |
| 1,991,759 | Lowther | Feb. 19, 1935 |
| 2,120,342 | Stidham | June 14, 1938 |
| 2,157,074 | Ericson | May 2, 1939 |
| 2,187,477 | Oestreichr | Jan. 16, 1940 |
| 2,333,627 | Austin | Nov. 9, 1943 |
| 2,529,242 | Brown et al. | Nov. 7, 1950 |